(12) United States Patent
Dobbs et al.

(10) Patent No.: US 10,914,337 B2
(45) Date of Patent: Feb. 9, 2021

(54) FASTENER LOCATING AND RETENTION DESIGN TO ACCOMMODATE PART EXPANSION AND CONTRACTION

(71) Applicant: Magna Exteriors Inc., Concord (CA)

(72) Inventors: Daniel R. Dobbs, Centralia, IL (US); Gregory A. Engele, Nashville, IL (US)

(73) Assignee: Magna Exteriors Inc., Concord (CA)

( * ) Notice: Subject to any disclaimer, the term of this patent is extended or adjusted under 35 U.S.C. 154(b) by 707 days.

(21) Appl. No.: 15/720,220

(22) Filed: Sep. 29, 2017

(65) Prior Publication Data

US 2018/0087553 A1 Mar. 29, 2018

Related U.S. Application Data

(60) Provisional application No. 62/401,577, filed on Sep. 29, 2016.

(51) Int. Cl.
*F16B 21/09* (2006.01)
*F16B 5/06* (2006.01)
*B62D 35/00* (2006.01)

(52) U.S. Cl.
CPC ............ *F16B 21/09* (2013.01); *F16B 5/0657* (2013.01); *B60Y 2410/113* (2013.01); *B62D 35/007* (2013.01); *Y02T 10/82* (2013.01)

(58) Field of Classification Search
CPC ........ F16B 21/09; F16B 21/07; F16B 21/071; F16B 21/073; F16B 21/078; F16B 5/0657; B60Y 2410/113; B62D 35/007
See application file for complete search history.

(56) References Cited

U.S. PATENT DOCUMENTS

| 3,188,730 | A  | * | 6/1965 | Meyer ..................... F16B 21/09 29/430 |
| 6,254,302 | B1 | * | 7/2001 | Kraus ................... F16B 5/0628 403/326 |
| 7,178,855 | B2 | * | 2/2007 | Catron ................... B60J 5/0468 24/297 |
| 7,784,857 | B2 | * | 8/2010 | Naik ....................... F16B 21/09 296/193.1 |
| 7,904,994 | B2 | * | 3/2011 | Girodo ................ B60R 13/0206 24/297 |
| 7,927,050 | B2 | * | 4/2011 | Koike .................... F16B 5/0628 411/104 |
| 9,249,814 | B2 | * | 2/2016 | Tsai ........................ A44B 15/00 |
| 9,297,400 | B2 | * | 3/2016 | Morris .................... F16B 17/00 |
| 9,541,113 | B2 | * | 1/2017 | Morris .................... F16B 19/02 |
| 9,630,573 | B2 | * | 4/2017 | Iwahara ................. F16B 5/0657 |
| 9,656,613 | B2 | * | 5/2017 | Bachelder ........... B60R 13/0206 |

(Continued)

FOREIGN PATENT DOCUMENTS

| DE | 202005017487 | * | 2/2006 |
| DE | 202016102439 | * | 9/2016 |

*Primary Examiner* — Jonathan P Masinick
(74) *Attorney, Agent, or Firm* — Warn Partners, P.C.

(57) ABSTRACT

A fastener locating and retention structure which includes a dog house attached to a part. The doghouse includes at least three walls and an opening in the fourth wall large enough for allowing a T-stud shaft portion to enter. A top surface it provided for extending inward from the walls. The top surface has an aperture formed there in by two pairs of spring retention legs which oppose each other engage the shaft portion of the T-stud on either side of the shaft thereof.

16 Claims, 10 Drawing Sheets

(56) References Cited

U.S. PATENT DOCUMENTS

| | | | |
|---|---|---|---|
| 9,938,997 B2* | 4/2018 | Iwahara | F16B 5/0657 |
| 2004/0083583 A1* | 5/2004 | Bradley | F16B 5/0657 |
| | | | 24/297 |
| 2011/0219588 A1* | 9/2011 | Inoue | F16B 21/09 |
| | | | 24/458 |
| 2012/0128410 A1* | 5/2012 | Naoi | F16L 3/223 |
| | | | 403/291 |
| 2016/0129854 A1* | 5/2016 | Bachelder | F16B 5/0657 |
| | | | 24/292 |
| 2018/0361950 A1* | 12/2018 | Baranowski | F16B 5/0692 |

* cited by examiner

FASTENER LOCATING AND RETENTION DESIGN TO ACCOMMODATE PART EXPANSION AND CONTRACTION

CROSS-REFERENCE TO RELATED APPLICATIONS

This application claims the benefit of U.S. Provisional Application No. 62/401,577, filed Sep. 29, 2016. The disclosures of the above application are incorporated herein by reference.

FIELD OF THE INVENTION

The present invention relates to fastener locating and retention design to accommodate part expansion and contraction.

BACKGROUND OF THE INVENTION

Plastic Automotive body panels, including, but not limited to, lift gate mounted rear spoilers, are often attached to sheet metal or glass. Because plastics expand and contract with temperature at a significantly greater rate than do sheet metal or glass, provision to accommodate the relative thermal expansion and contraction are required at fastening points.

Some of the methods of attachment are as follows. Slotted holes are sometimes used in attaching panel. Such attachments can be effective but require the use of shoulder bolts and may be difficult to seal if water management is a concern. "Raised detents" are also sometime used to locate the fastener. In this case tuning is difficult as very small changes significantly change installation and extraction forces. This may cause problems in ergonomic issues and/or extraction forces that are too high to be overcome during part thermal expansion/contraction. These drawbacks sometimes result in unwanted bulging or breaking of the attached part during thermal events.

In accordance with the present invention, in order to overcome these deficiencies, it is an object of the present invention to: improve accommodation of thermal expansion and contraction; achieve consistent and acceptable installation effort; provide for audible and tactile confirmation of correct fastener placement during assembly; and improve consistency of "tuning" fastener fits to the retention features.

SUMMARY OF THE INVENTION

In accordance with the present invention there is provided a fastener locating and retention structure which includes a dog house attached to a part. The doghouse includes at least three walls and an opening in the fourth wall large enough for allowing a T-stud shaft portion to enter. A top surface it provided for extending inward from the walls. The top surface has an aperture formed there in by two pairs of spring retention legs which oppose each other engage the shaft portion of the T-stud on either side of the shaft thereof.

This invention is compatible with existing fasteners including but not limited to T-Studs and T-Nuts, which are proven to seal out water in a variety of applications. Tuning of the fastener retention features will be significantly more controllable and consistent because the shape of the retention feature results in a low spring rate and small tuning changes result in small changes in insertion and extraction loads. This will reduce or eliminate ergonomic and thermal expansion performance issues.

Objectives are to improve accommodation of thermal expansion and contraction; achieve consistent and acceptable installation effort; provide for audible and tactile confirmation of correct fastener placement during assembly; and improve consistency of "tuning" fastener fits to the retention features.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of the preferred embodiment(s) is merely exemplary in nature and is in no way intended to limit the invention, its application, or uses.

Cantilever spring arms with detents at their ends that can flex to permit the fastener to be easily installed with consistent effort and to permit fastener movement during thermal events.

Figure 1:
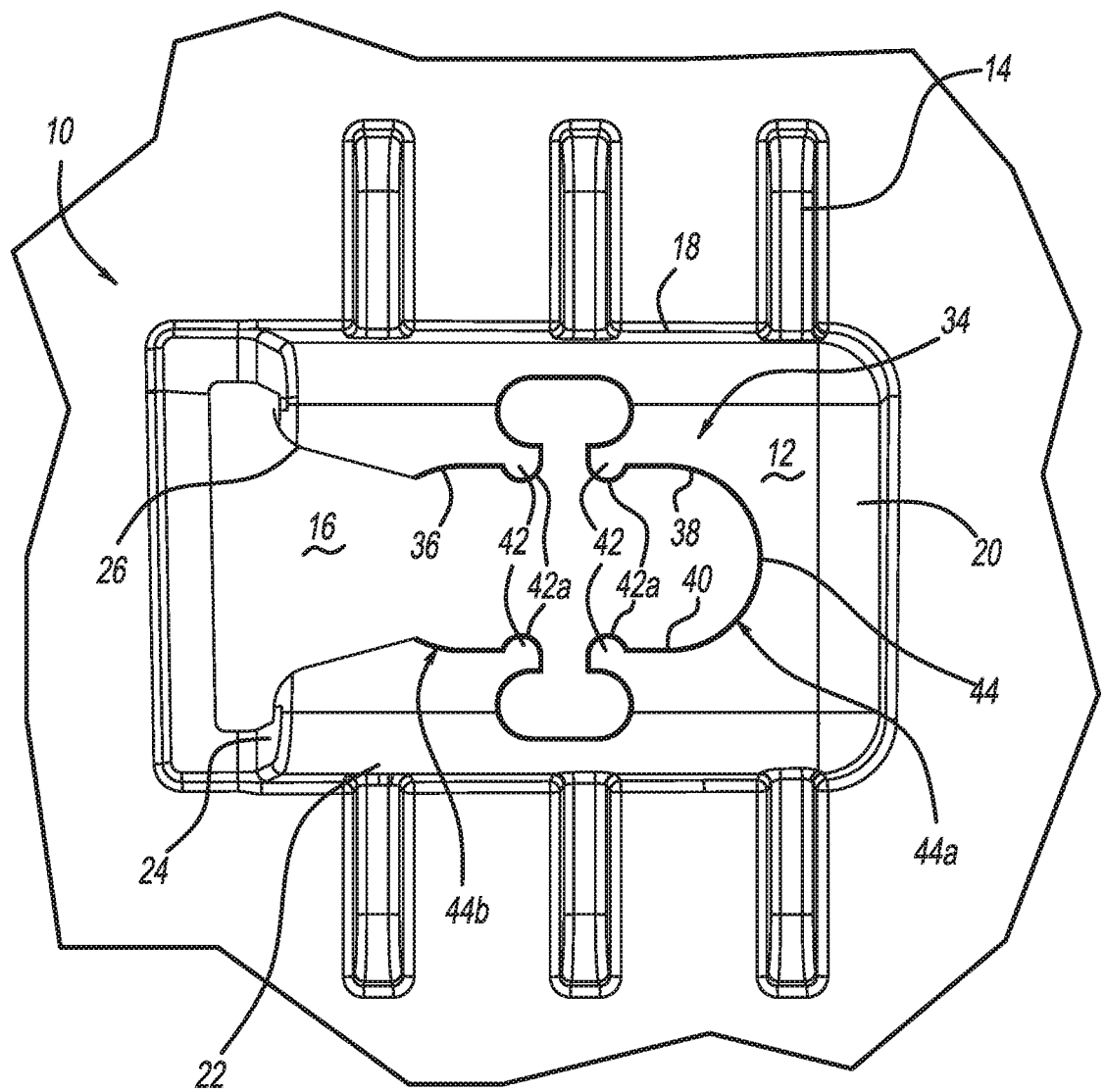
FIG. 1 plan view of the fastener locating and retention structure of the present invention showing the retention opening from the top.
Figure 2:
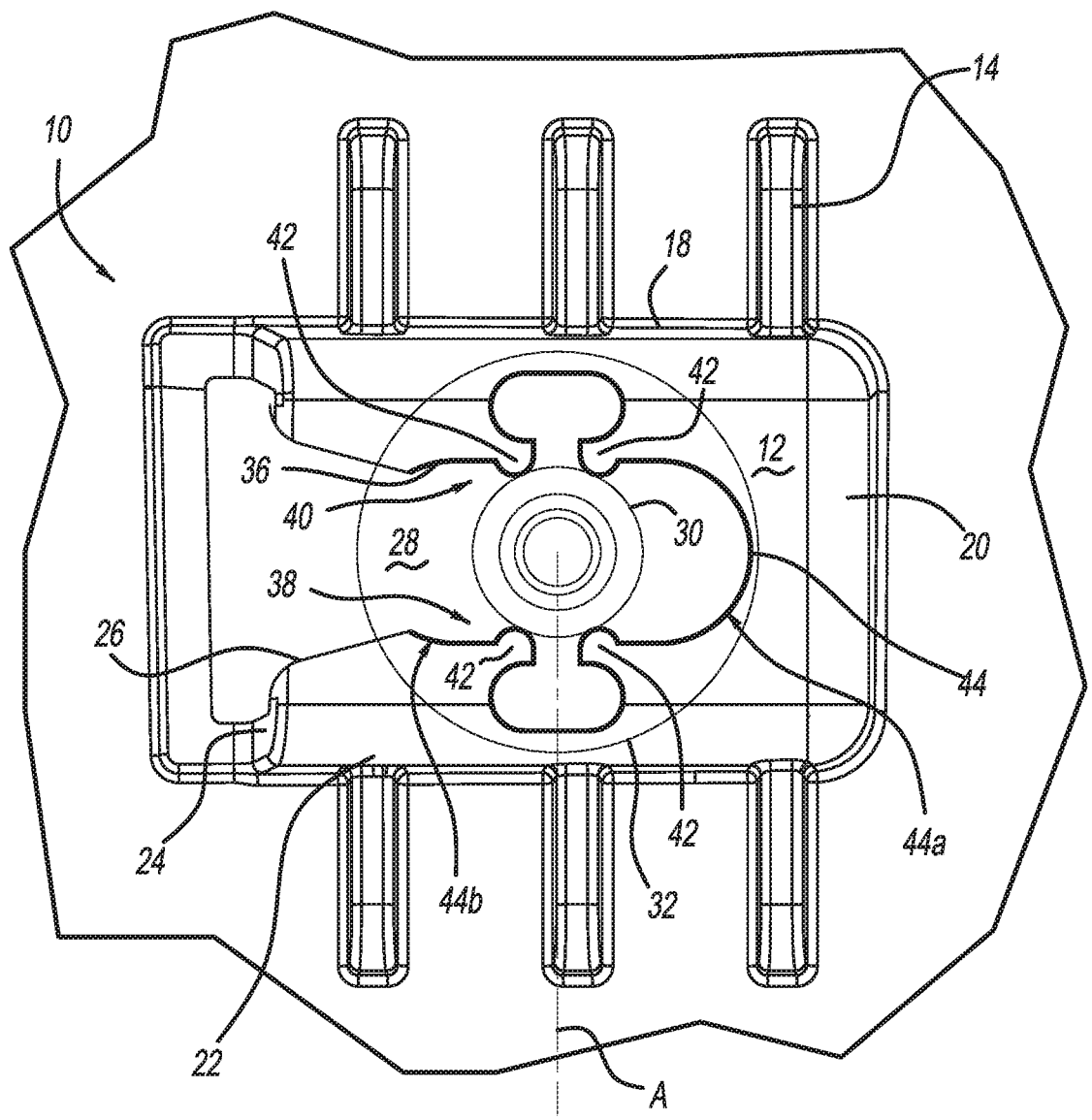
FIG. 2 is the plan view of FIG. 1 showing the fastener locating and retention structure with a fastener engaged by the retention arms.
Figure 3:
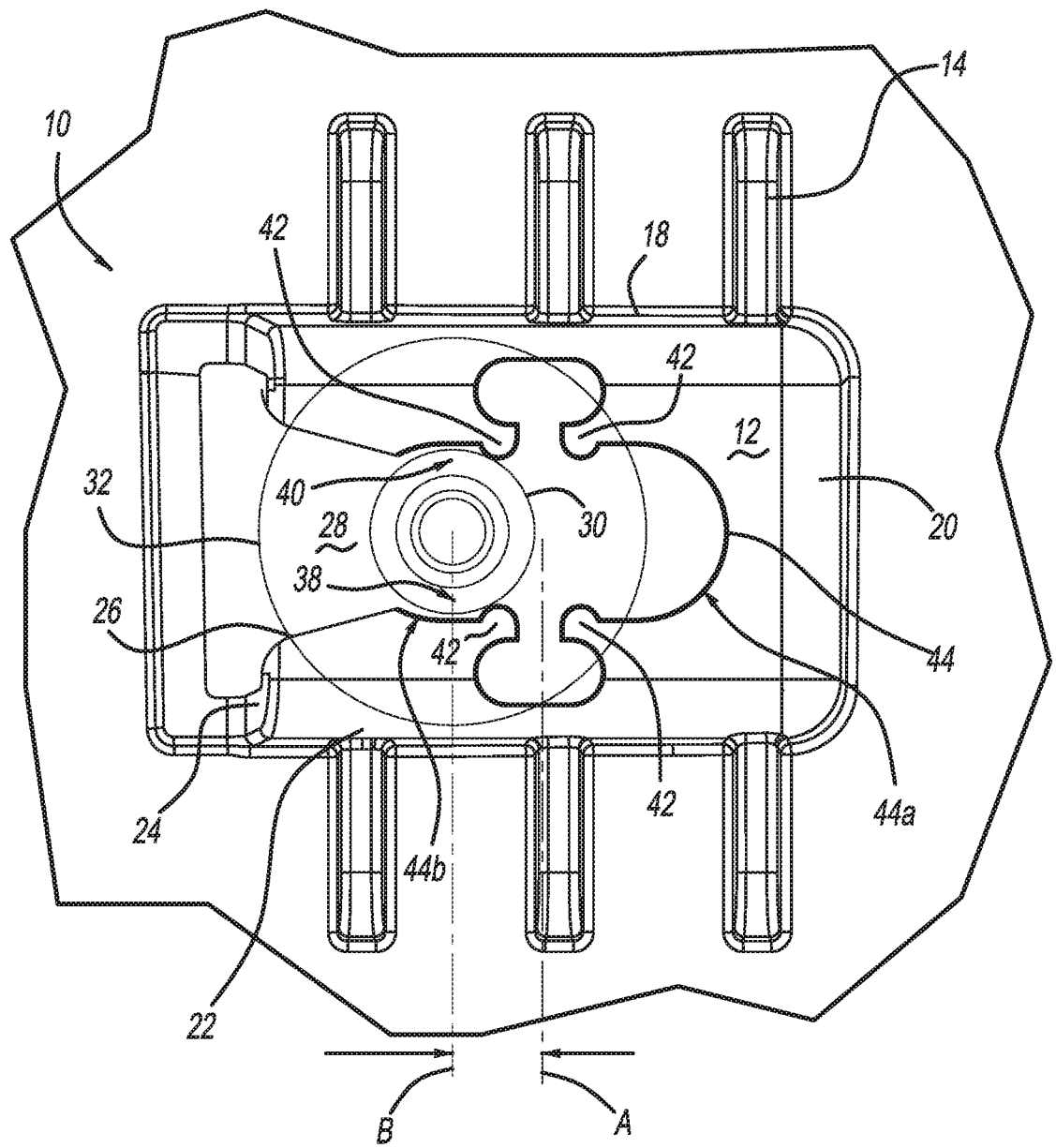
FIG. 3 is a plan view of FIG. 2 showing the stud and retention arms operating in response to thermal shifting of the part In a first direction.
Figure 4:
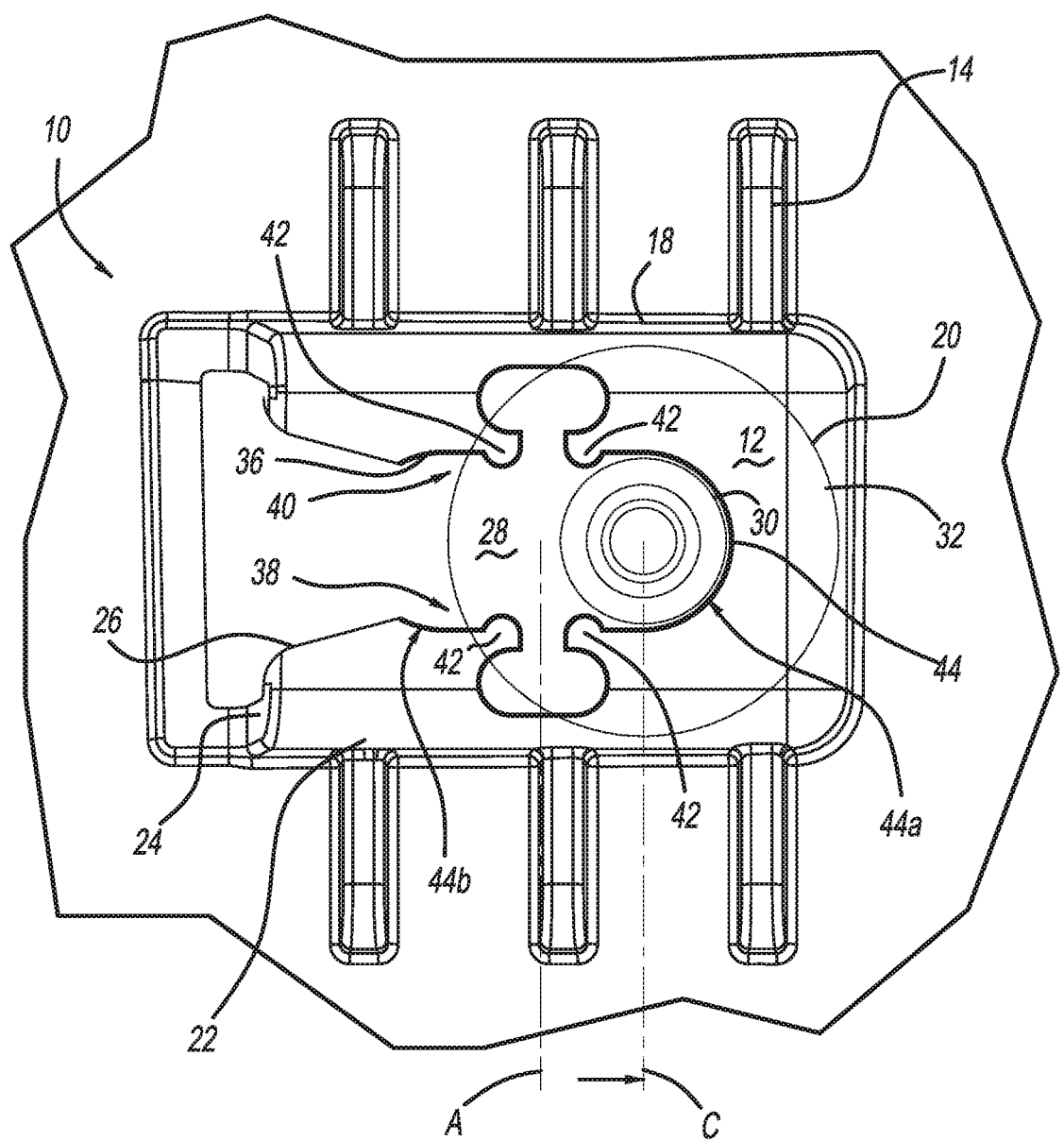
FIG. 4 is a plan view of FIG. 2 showing the stud and retention arms operating in response to thermal shifting of the part In a second direction.

In accordance with the present invention there is provided a fastener locating and retention structure generally shown at 10 comprising a dog house member 12 attached to a part 14 by way of T-stud fastener 15. The dog house 12 including a first base 16 having at least three walls 18,20 and 22 extending perpendicularly therefrom and a fourth wall 24 having an opening 26 large enough for allowing a T-stud end portion 28 and shaft portion 30 of the T-stud fastener 15 to enter from a predetermined direction of the opening 26. The T-stud 15 also includes a head portion 32 (which is round in the present case, but which can be any suitable shape without departure from the scope of the present invention). Preferably, the head portion 32 is a washer. In FIGS. 2-4 the head 32 is shown in phantom so that the retention features may be illustrated.

Figure 5:
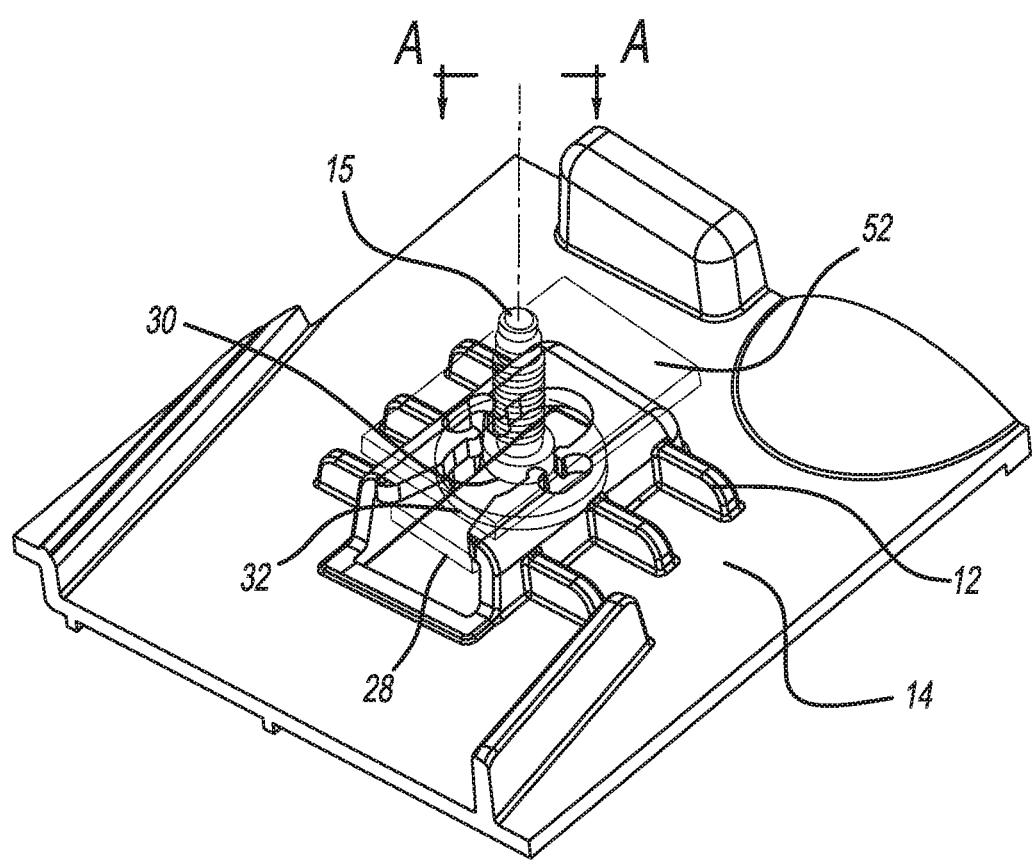
FIG. 5 is a side view showing the side opening where the fastener element enters the structure.

A second retention surface portion, shown generally at 34, is provided for extending inward from the three walls 18, 20 and 22. The retention surface portion 34 has an aperture 36 formed therein. The aperture 36 includes two opposing pairs, shown generally at 38 and 40, of spring retention arms 42 which oppose each other to engage the shaft portion 30 of the T-stud on either side of the shaft 30 thereof. Each spring retention arm 42 includes a detent portion 42a. The aperture 36 includes surfaces forming an over-ride slot 44 which includes first 44a and second 44b override slots longitudinally extending from either side of the retention arms 42 such that the shaft is normally engaged by the retention arms 42 for attachment of a part to a substrate when aligning the T-stud as shown in FIG. 2. The T-stud 15 is generally located by retention features 42 at a nominal location for assembly to a part, e.g., sheet of a vehicle, as indicated by axis 'A' central to the retention arms. FIG. 5 also illustrates the T-stud 15 at a nominal location generally centered in the spring retention arms 42 of the two opposing pairs 38,40. After assembly the connection can shift during thermal expansion or contraction conditions into the longitudinal slot areas 44a and 44b such that connection between the part and the substrate is maintained. This is illustrated in FIGS. 3 and 4.

Figure 6:
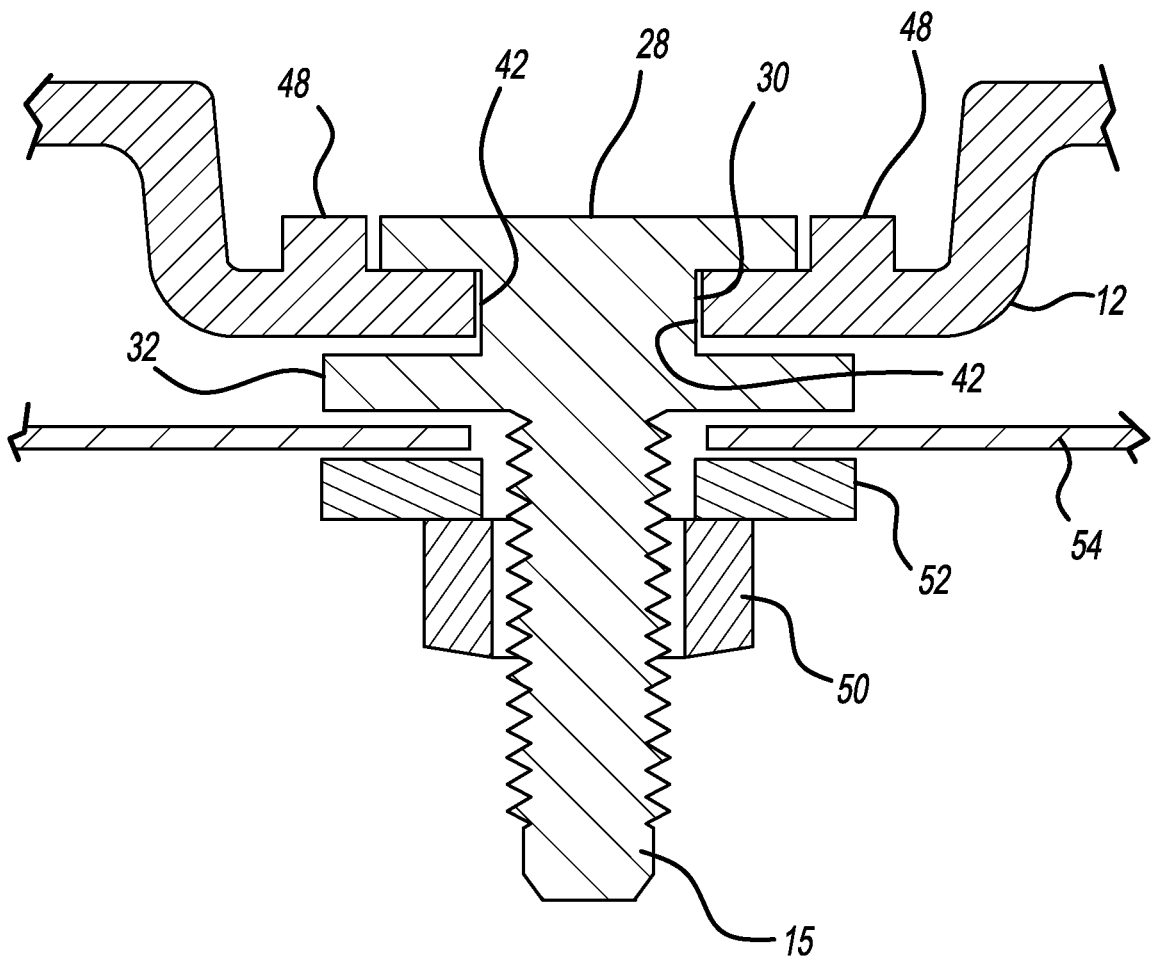
FIG. 6 is a sectional view taken along line A-A.

Referring to the sectional view of FIG. 6 (taken along A-A of FIG. 5) a nut 50 with a washer arrangement 52, e.g., foam washer arrangement, is used to secure the part having the doghouse 12 to the vehicle part 54, e.g., sheet metal, glass, etc of the vehicle. Walls 48 formed in the doghouse 12 keep the T-stud end portion 28 from rotating during attachment of the fastener 50.

The washer arrangement 52 is typically a rectangular foam seal that is compressed between the head portion 32 on the T-stud 15 and sheet metal 54. Any other suitable shape, e.g., round or square, is contemplated depending on the application without departure from the scope of the present invention, and in applications where sealing is not required, the washer arrangement 52 can be eliminated entirely.

Thus in operation a T-stud is inserted into the slot into the locational position of FIG. 2 and the part is attached to a vehicle. As the part goes through thermal expansion the fastener has room for expansion along the longitudinal slot areas 44a as shown in FIGS. 4 and 44b as shown in FIG. 3 which maintains the fastening between the parts even during relative movement between the parts during thermal expansion events.

FIG. 3 illustrates an exemplary axis 'B' indicating the T-stud 15 center relative to the retention arms axis 'A' after thermal expansion at predetermined high temperature. The T-stud location relative to the vehicle part is fixed (e.g. fixed relative to sheet metal, glass, etc). When heated the plastic part expands faster than the vehicle part. Thus, the location of the T-stud 15 relative to the plastic part must change to accommodate part expansion. As the plastic part expands, the retention arms 42 flex, operably releasing the T-stud 15 an effective amount, allowing the part to expand.

FIG. 4 illustrates an exemplary axis 'C' indicating the T-stud center relative to the retention arms axis 'A' after thermal contraction at predetermined low temperature. The T-stud location relative to the vehicle part is fixed (e.g. fixed relative to sheet metal, glass, etc). When cooled, the plastic part contracts faster than the vehicle part. Thus, the location of the T-stud 15 relative to the plastic part must change to accommodate part contraction. As the plastic part expands, the retention arms 42 flex, operably releasing the T-stud 15 an effective amount, allowing the part to contract.

Referring now to FIGS. 7-15, where like numbers reflect like parts, there are illustrated alternative retention structures and profiles.

Figure 7:
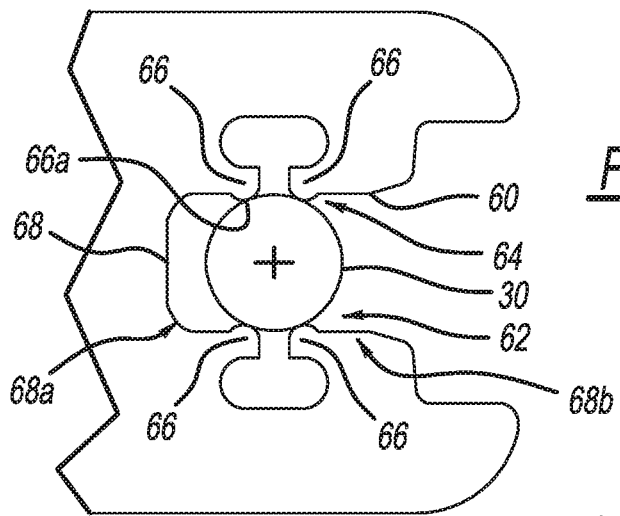
FIGS. 7-15 are plan views of alternative retention structure.

As shown in FIG. 7, the retention surface portion has an aperture 60 formed therein. The aperture 60 includes two opposing pairs, shown generally at 62 and 64, of spring retention arms 66 which oppose each other to engage the shaft portion 30 of the T-stud on either side of the shaft 30 thereof. Each spring retention arm 66 has a detent 66a portion. The aperture 60 includes surfaces forming an over-ride slot 68 which includes first and second override slots, shown generally at 68a and 68b, longitudinally extending from either side of the retention arms 66 such that the shaft is normally engaged by the retention arms 66 for attachment of a part to a substrate when aligning the T-stud as shown in FIG. 7.

Figure 8:
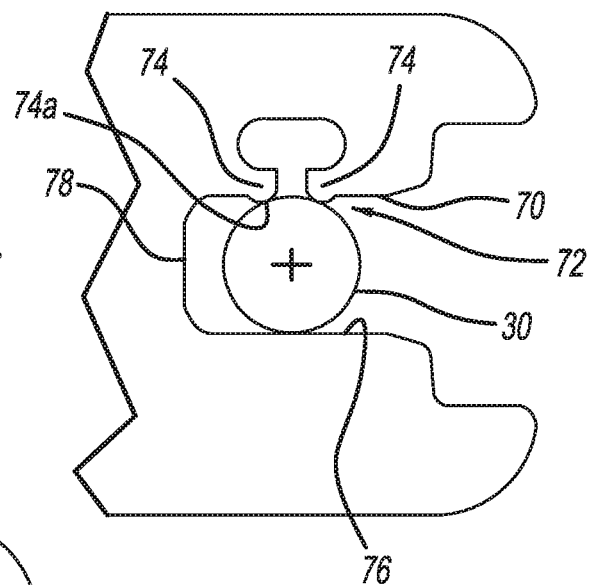
Figure 9:
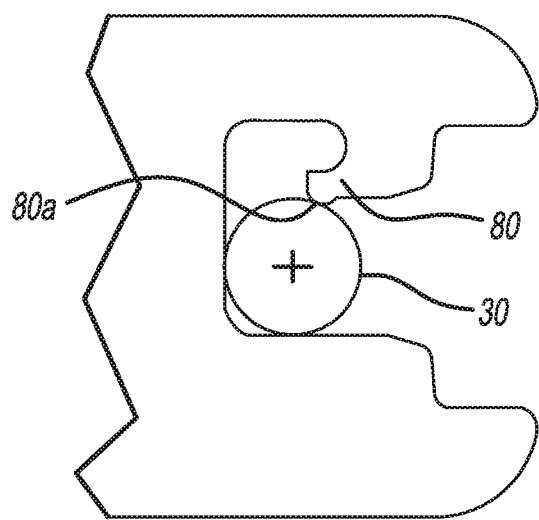

As shown in FIG. 8, there is provided a single sided detent. The retention surface portion has an aperture 70 formed therein. The aperture 70 includes one pair, shown generally at 72, of spring retention arms 74, each having a detent 74a portion, and a substantially flat surface 76 which oppose each other to engage the shaft portion 30 of the T-stud on either side of the shaft 30 thereof. The aperture 70 includes surfaces forming an over-ride slot 78 such that the shaft is normally engaged by the retention arm 74 and surface 76 for attachment of a part to a substrate when aligning the T-stud as shown in FIG. 8. FIG. 9 illustrates an alternative including a single retention arm 80 with a single detent 80a portion.

Figure 10:
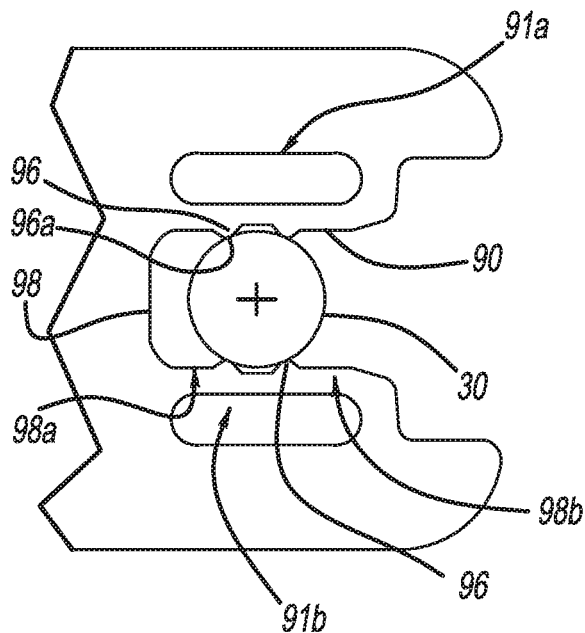

As shown in FIG. 10, there is provided a beam spring arrangement with substantially triangular detents (more rounded is contemplated depending on the application without departure from the scope of the present invention). The retention surface has opposing beam spring portions shown generally at 91a and 91b. The retention surface portion has an aperture 90 formed therein. The aperture 90 includes two opposing beam spring arms 94 and 96 which oppose each other to engage the shaft portion 30 of the T-stud on either side of the shaft 30 thereof. Each beam spring arm 94 and 96 has at least two detents 96a. The aperture 90 includes surfaces forming an over-ride slot 98 which includes first and second override slots, shown generally at 98a and 98b, longitudinally extending from either side of the beam spring arms 94,96 such that the shaft is normally engaged by the beam spring arms 94,96 for attachment of a part to a substrate when aligning the T-stud as shown in FIG. 10.

Figure 11:
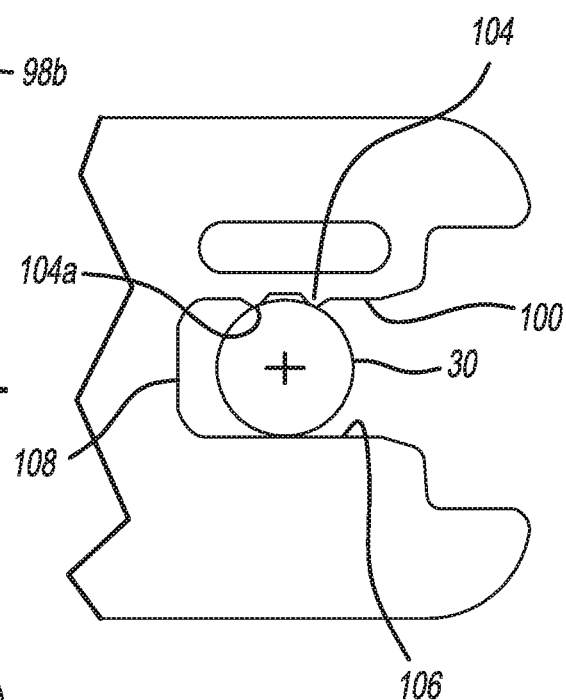
Figure 12:
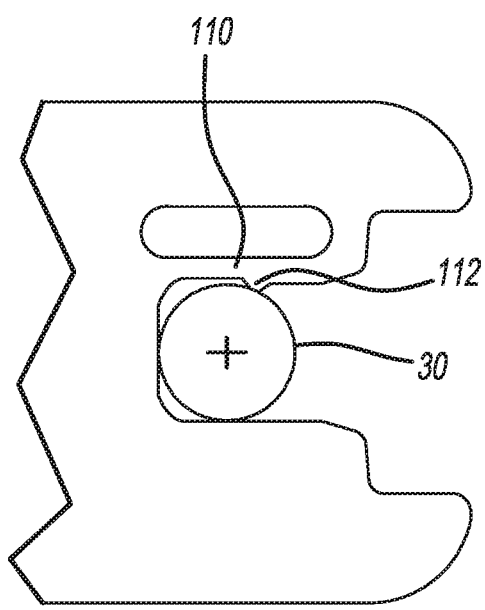

As shown in FIG. 11, there is provided a single sided detent. The retention surface portion has an aperture 100 formed therein. The aperture 100 includes one beam spring arm 104, including at least two detents 104a, and a substantially flat surface 106 which oppose each other to engage the shaft portion 30 of the T-stud on either side of the shaft 30 thereof. The aperture 100 includes surfaces forming an over-ride slot 108 such that the shaft is normally engaged by the beam spring arm 104 and surface 106 for attachment of a part to a substrate when aligning the T-stud as shown in FIG. 10. FIG. 12 illustrates an alternative single beam spring arm 110 including a single detent 112.

Figure 13:
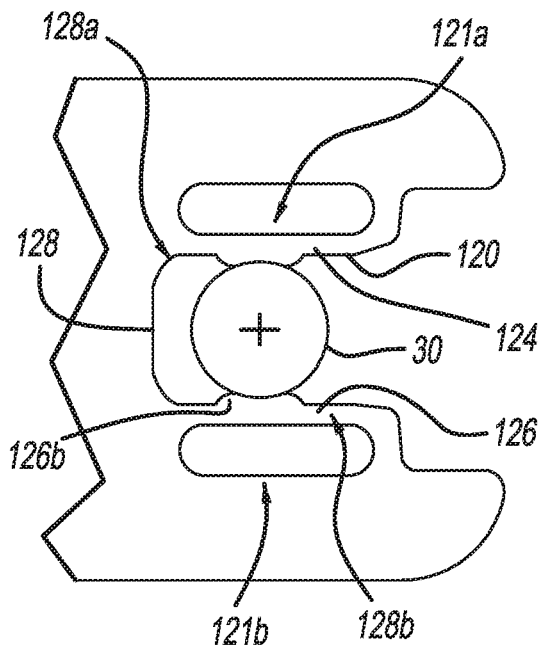

As shown in FIG. 13, there is provided a beam spring arrangement with substantially triangular detents (more rounded is contemplated depending on the application without departure from the scope of the present invention). The retention surface has opposing beam spring portions shown generally at 121a and 121b. The retention surface portion has an aperture 120 formed therein. The aperture 120 includes two opposing beam spring arms 104 and 106 which oppose each other to engage the shaft portion 30 of the T-stud on either side of the shaft 30 thereof. Each beam spring arm 124 and 126 has at least one conforming radius detent 126b, e.g., with respect to the radius of the T-stud shaft 30. The aperture 120 includes surfaces forming an over-ride slot 128 which includes first and second override slots, shown generally at 128a and 128b, longitudinally extending from either side of the beam spring arms 94,96 such that the shaft is normally engaged by the beam spring arms 124,126 for attachment of a part to a substrate when aligning the T-stud as shown in FIG. 13.

Figure 14:
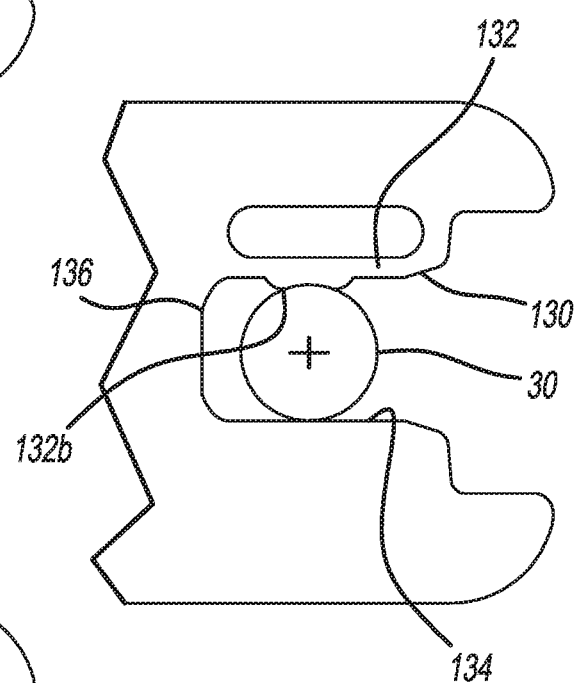
Figure 15:
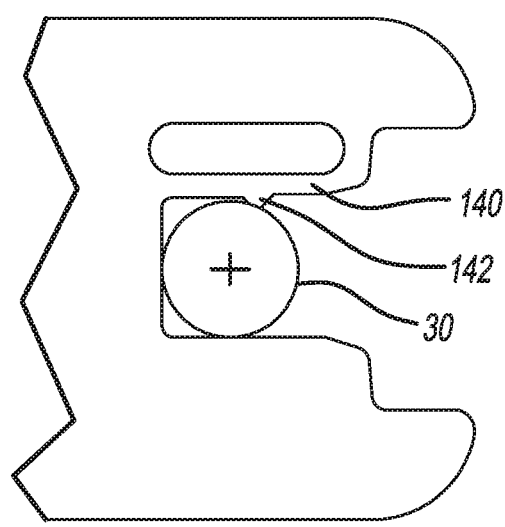

As shown in FIG. 14, there is provided a single sided detent. The retention surface portion has an aperture 130 formed therein. The aperture 130 includes one beam spring arm 132, including at least one conforming radius detent 132b, and a substantially flat surface 134 which oppose each other to engage the shaft portion 30 of the T-stud on either side of the shaft 30 thereof. The aperture 130 includes surfaces forming an over-ride slot 136 such that the shaft is normally engaged by the beam spring arm 132 and surface 134 for attachment of a part to a substrate when aligning the T-stud as shown in FIG. 13. FIG. 15 illustrates an alternative single beam spring arm 140 including a conforming radius detent 142.

Figure 16:
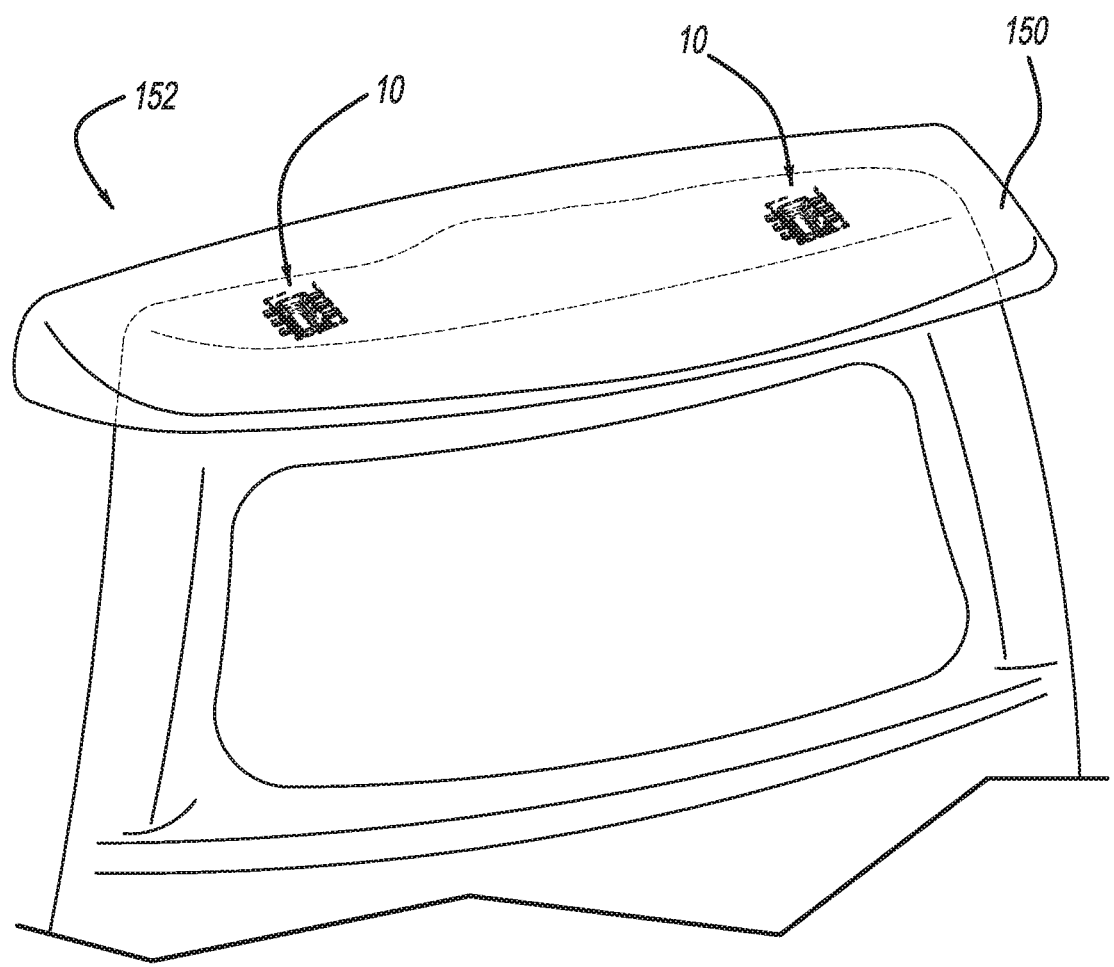
FIG. 16 is a perspective view of an environment of use of the present invention adjacent a vehicle lift gate spoiler structure.

FIG. 16 is an exemplary environment of use depicting the fastener locating and retention structure 10 installed on a vehicle lift gate spoiler 150 of a lift gate assembly indicated generally at 152.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A fastener locating and retention structure, comprising:
   a doghouse member operably coupled to a part, said doghouse member having an opening large enough for allowing a fastener to enter from a predetermined direction of the opening;
   a retention surface portion including at least two opposing retention members which oppose each other to engage the fastener on either side thereof;
   an over-ride slot longitudinally extending from either side of the retention members such that the fastener is normally engaged by the retention members for attachment of the part to a substrate but can shift during thermal expansion or contraction conditions into longitudinal slot areas such that connection between the part and the substrate is maintained;
   wherein said fastener is a T-stud including a shaft, and said shaft engages said retention members for assembly and said over-ride slot during said thermal expansion or contraction, and
   wherein said at least two opposing retention members includes two opposing spaced pairs of retention arms which oppose each other to engage said shaft of said T-stud.

2. The fastener locating and retention structure of claim 1, wherein said over-ride slot includes a first over-ride slot formed to one side of opposing retention members and a second over-ride slot is formed to another side of another opposing retention members.

3. The fastener locating and retention structure of claim 1, wherein said at least two opposing retention members includes two opposing spaced beam spring retention members which oppose each other to engage said shaft of said T-stud.

4. The fastener locating and retention structure of claim 3, wherein said over-ride slot includes a first over-ride slot formed to one side of detents formed on opposing beam spring retention members and a second over-ride slot is formed to another side of said detents or second detents formed on the opposing retention members.

5. The fastener locating and retention structure of claim 1, wherein said at least two opposing retention members includes at least one detent portion.

6. The fastener locating and retention structure of claim 5, wherein said over-ride slot includes a first over-ride slot to one side of said at least one detent portion of said retention arms and a second over-ride slot to the other side of said at least one detent portion of said retention arms.

7. The fastener locating and retention structure of claim 1, wherein said at least two opposing retention members are spring retention arms or beam spring members each with at least one detent portion.

8. The fastener locating and retention structure of claim 1, wherein said at least two opposing retention members are spring retention arms each with at least one detent portion.

9. The fastener locating and retention structure of claim 1, wherein said structure is injection molded into said part.

10. The fastener locating and retention structure of claim 1, wherein said part is a spoiler and said structure is a rear liftgate of a vehicle.

11. The fastener locating and retention structure of claim 1, wherein said doghouse includes a first base having at least three walls extending perpendicularly therefrom and a fourth wall having said opening large enough for allowing an end portion and the shaft of said fastener to enter from the predetermined direction of the opening.

12. The fastener locating and retention structure of claim 1, wherein said doghouse includes a plurality of walls formed in the doghouse to keep an end portion of said fastener from rotating during attachment of a second fastener to said fastener.

13. The fastener locating and retention structure of claim 1, wherein said retention surface portion includes an aperture comprising said at least two opposing retention members.

14. The fastener locating and retention structure of claim 13, wherein said at least two opposing retention members includes said two opposing spaced pairs of retention arms, each with a detent portion, which oppose each other to engage said shaft of said fastener when in a nominal location, and which flex to release the shaft an effective amount to allow thermal expansion during higher temperatures or to allow contraction during lower temperatures into respective longitudinal slot areas of the longitudinal over-ride slot while the connection between the part and the substrate is maintained.

15. A fastener locating and retention structure, comprising:
   a doghouse member operably coupled to a part, said doghouse member having an opening large enough for allowing a T-stud fastener to enter from a predetermined direction of the opening;
   a retention surface portion including at least two opposing retention members which oppose each other or an opposing surface formed in the retention surface portion to engage the fastener on either side thereof, wherein the at least two opposing retention arm members includes two opposing spaced pairs of spring retention arms which oppose each other to engage a shaft portion of the T-stud;
   an over-ride slot longitudinally extending from either side of the retention members such that the fastener is normally engaged by the retention members for attachment of the part to a substrate but can shift during thermal expansion or contraction conditions into longitudinal slot areas such that connection between the part and the substrate is maintained.

16. A fastener locating and retention structure, comprising:
- a doghouse member operably coupled to a part, said doghouse member having an opening large enough for allowing a fastener to enter from a predetermined direction of the opening;
- a retention surface portion including at least two opposing retention members which oppose each other to engage the fastener on either side thereof;
- an over-ride slot longitudinally extending from either side of the retention members such that the fastener is normally engaged by the retention members for attachment of the part to a substrate but can shift during thermal expansion or contraction conditions into longitudinal slot areas such that connection between the part and the substrate is maintained;
- said retention surface portion includes an aperture comprising said at least two opposing retention members, wherein said at least two opposing retention members includes two opposing spaced pairs of retention arms, each with a detent portion, which oppose each other to engage a shaft of said fastener when in a nominal location, and which flex to release the shaft an effective amount to allow thermal expansion during higher temperatures or to allow contraction during lower temperatures into respective longitudinal slot areas of the longitudinal over-ride slot while the connection between the part and the substrate is maintained.

* * * * *